(12) United States Patent
Maeda

(10) Patent No.: US 8,049,775 B2
(45) Date of Patent: Nov. 1, 2011

(54) SYSTEM FOR OBTAINING CONNECTION RELATIONSHIPS BETWEEN STEREOSCOPIC IMAGE PROCESSING DEVICES

(75) Inventor: Sonoko Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 12/058,892

(22) Filed: Mar. 31, 2008

(65) Prior Publication Data

US 2008/0266386 A1 Oct. 30, 2008

(30) Foreign Application Priority Data

Apr. 25, 2007 (JP) ................. 2007-116113

(51) Int. Cl.
*H04N 13/02* (2006.01)
*H04N 13/04* (2006.01)

(52) U.S. Cl. .......................... 348/47; 348/53

(58) Field of Classification Search .................... 348/62, 348/63, 42, 47, 51–53; 382/114
See application file for complete search history.

(56) References Cited

U.S. PATENT DOCUMENTS

| 5,777,715 A * | 7/1998 | Kruegle et al. ............... 351/158 |
| 6,177,952 B1 * | 1/2001 | Tabata et al. .................... 348/47 |
| 7,573,525 B2 * | 8/2009 | Yamasaki ..................... 348/345 |
| 7,859,562 B2 * | 12/2010 | Igarashi et al. .................. 348/61 |
| 2004/0056870 A1 * | 3/2004 | Shimoyama et al. ......... 345/629 |
| 2006/0081793 A1 * | 4/2006 | Nestorovic et al. .......... 250/580 |
| 2007/0046776 A1 * | 3/2007 | Yamaguchi et al. ............ 348/53 |

FOREIGN PATENT DOCUMENTS

JP 2002-159019 5/2002

* cited by examiner

*Primary Examiner* — Yemane Mesfin
(74) *Attorney, Agent, or Firm* — Cowan, Liebowitz & Latman, P.C.

(57) ABSTRACT

An unit (317, 318) acquires identification information from a camera (101R) (left camera 101L). The unit (303, 312) checks a connection state based on the identification information, and determines the subsequent operation. A unit (305) transmits position and orientation information of the camera (101R) to an apparatus (206). A unit (308) outputs a composite image of a virtual space image generated based on the position and orientation information and a captured image input by a unit (302) to an HMD (100). A unit (313) calculates the position and orientation of the camera (101L) using position and orientation relationship information and the position and orientation information. An unit (316) outputs a composite image of a virtual space image generated based on the position and orientation of the camera (101L), and a captured image input by a unit (311) to the HMD (100).

3 Claims, 5 Drawing Sheets

SYSTEM FOR OBTAINING CONNECTION RELATIONSHIPS BETWEEN STEREOSCOPIC IMAGE PROCESSING DEVICES

BACKGROUND OF THE INVENTION

1. Field of the Invention

The present invention relates to a technique for stereoscopic viewing.

2. Description of the Related Art

A VR (Virtual Reality) system presents a three-dimensional (3D) CG (Computer Graphic) picture created by a computer to the user to make him or her experience a virtual space as if it were a physical space.

In recent years, a technique for presenting, to the user, information which does not actually exist on the physical space by compositing a 3D CG on a picture of the physical space has been developed. Such technique is called an MR (Mixed Reality) system. This MR system draws attention as a technique that aims at the coexistence of a virtual space which could be experienced in only a situation separated from the physical space, and the physical space, and augments the virtual space.

As a representative apparatus which implements a system (VR/MR system) that allows the coexistence of the virtual and physical spaces, a head mounted display (HMD) is known. In the VR/MR system, by displaying the virtual or physical space on the HMD, the virtual space and mixed reality space can be presented to the user who wears the HMD (see Japanese Patent Laid-Open No. 2002-159019).

FIG. 1 illustrates a state in which the user wears a stereoscopic video see-through HMD 100 (to be simply referred to as an HMD 100 hereinafter). The HMD 100 has an outer appearance shape similar to spectacles or goggles, and a display device 102R for the right eye and display device 102L for the left eye, which are such as LCDs, are arranged in the HMD 100. The display device 102R for the right eye will be referred to as a right display device 102R, and the display device 102L for the left eye will be referred to as a left display device 102L hereinafter. Upon acquiring a stereoscopic video picture by video cameras equipped in the HMD 100, a stereoscopic video camera 101R for the right eye and stereoscopic video camera 101L for the left eye are arranged in the vicinity of, e.g., the viewpoint position of the user (wearer). The stereoscopic video camera 101R for the right eye will be referred to as a right camera 101R, and the stereoscopic video camera 101L for the left eye will be referred to as a left camera 101L hereinafter.

In order to implement stereoscopic viewing (to present a stereoscopic image to the user), a pair of images having disparity like images for the right and left eyes need to be generated and be displayed on the display devices for the right and left eyes. In order to generate images having disparity, the disparity between the right and left eyes, i.e., the position and orientation of the other camera viewed from one camera need to be calculated. As a method of calculating this, a method of capturing a plurality of test images by the cameras for the right and left eyes, and calculating the position and orientation relationship between the cameras from the plurality of test images is known.

Conventionally, images for the right and left eyes are generated using one image processing apparatus. However, in order to speed up image generation, the images for the right and left eyes may be generated by independent image processing apparatuses. In such arrangement, in order to calculate the positions and orientations of the cameras for the right and left eyes, the user must define, in advance, the connection relationship between the image processing apparatuses connected to these cameras. However, when the user defines a wrong connection relationship upon actually connecting the image processing apparatuses, the connected image processing apparatuses cannot correctly calculate the positions and orientations of the cameras for the right and left eyes.

SUMMARY OF THE INVENTION

The present invention has been made in consideration of the aforementioned problems, and has as its object to provide a technique for simply obtaining the connection relationship between the image processing apparatuses respectively connected to the cameras for the right and left eyes, and presenting a composite image of the virtual space and physical space to the user, using the obtained connection relationship.

According to the first aspect of the present invention, a system which comprises a first image processing apparatus that receives an image of a physical space captured by a first camera of a head mounted display device, and a second image processing apparatus that receives an image of the physical space captured by a second camera of the head mounted display device, the first image processing apparatus comprises:

a determination unit adapted to determine whether or not the first camera is a master;

a unit adapted to acquire, when the determination unit determines that the first camera is a master, position and orientation information of the first camera, and to acquire, when the determination unit determines that the first camera is not a master, position and orientation information of the second camera from the second image processing apparatus;

a unit adapted to output, when the determination unit determines that the first camera is a master, position and orientation information of the first camera to the second image processing apparatus;

a unit adapted to acquire, when the determination unit determines that the first camera is not a master, position and orientation relationship information indicating a position and orientation relationship between the first camera and the second camera;

a unit adapted to calculate, when the determination unit determines that the first camera is not a master, position and orientation information of the first camera based on the position and orientation information of the second camera and the position and orientation relationship information;

a unit adapted to generate a virtual space image based on the position and orientation information of the first camera;

a unit adapted to acquire an image of the physical space captured by the first camera;

a generation unit adapted to generate a composite image formed by compositing the image of the physical space and the virtual space image; and a unit adapted to output the composite image to the head mounted display device, and the second image processing apparatus comprises:

a second determination unit adapted to determine whether or not the second camera is a master;

a unit adapted to acquire, when the second determination unit determines that the second camera is a master, position and orientation information of the second camera, and to acquire, when the second determination unit determines that the second camera is not a master, position and orientation information of the first camera from the first image processing apparatus;

a unit adapted to output, when the second determination unit determines that the second camera is a master, the position and orientation information of the second camera to the first image processing apparatus;

a unit adapted to acquire, when the second determination unit determines that the second camera is not a master, position and orientation relationship information indicating a position and orientation relationship between the first camera and the second camera;

a unit adapted to calculate, when the second determination unit determines that the second camera is not a master, position and orientation information of the second camera based on the position and orientation information of the first camera and the position and orientation relationship information;

a unit adapted to generate a virtual space image based on the position and orientation information of the second camera;

a unit adapted to acquire an image of the physical space captured by the second camera;

a second generation unit adapted to generate a composite image formed by compositing the image of the physical space captured by the second camera and the virtual space image generated based on the position and orientation information of the second camera; and a unit adapted to output the composite image to the head mounted display device.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

Figure 1:
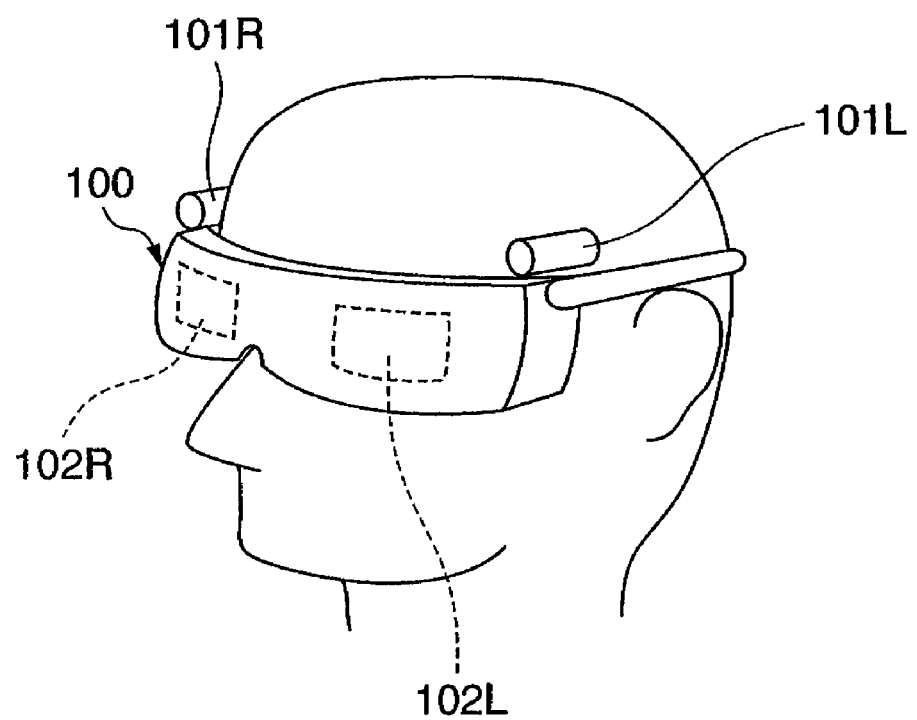
FIG. 1 is a view illustrating a state in which the user wears a stereoscopic video see-through HMD 100.
Figure 2:
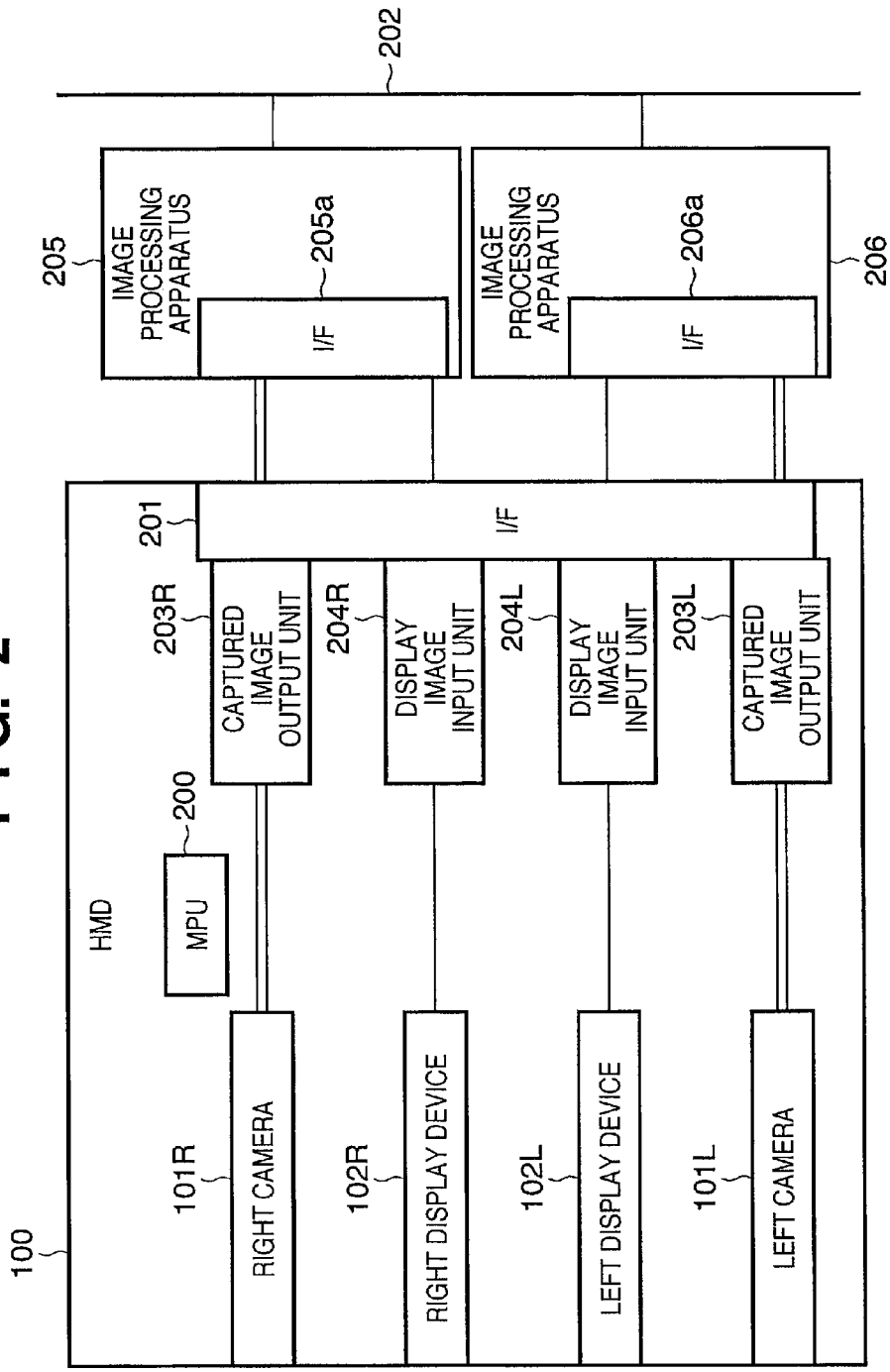
FIG. 2 is a block diagram showing the functional arrangement of a system according to the first embodiment of the present invention.

FIG. 2 is a block diagram showing the functional arrangement of a system according to this embodiment. As shown in FIG. 2, the system according to this embodiment comprises an HMD 100 as a head mounted display device, and image processing apparatuses 205 and 206. The user connects the image processing apparatus 205 to a right-eye unit of the HMD 100 via a cable. Similarly, the user connects the image processing apparatus 206 to a left-eye unit of the HMD 100 via a cable. That is, in the arrangement of FIG. 1, the image processing apparatus 205 is that for the right eye, and the image processing apparatus 206 is that for the left eye. The image processing apparatuses 205 and 206 are connected to be able to communicate with each other via a network 202 such as a LAN, Internet, or the like.

The HMD 100 will be described first. The HMD 100 has the right-eye unit, which comprises a right camera (camera for the right eye) 101R, right display device 102R, captured image output unit 203R, and display image input unit 204R. Likewise, the HMD 100 has the left-eye unit, which comprises a left camera (camera for the left eye) 101L, left display device 102L, captured image output unit 203L, and display image input unit 204L.

The right camera 101R is a video camera which captures a movie of the physical space, which is seen from the vicinity of the right eye position of the user who wears the HMD 100, as shown in FIG. 1. Data of images (to be referred to as captured images or physical space images hereinafter) of respective frames captured by the right camera 101R are output to the image processing apparatus 205 via the captured image output unit 203R and an I/F (interface) 201. Note that the right camera 101R serves as a first camera in this embodiment.

The left camera 101L is a video camera which captures a movie of the physical space, which is seen from the vicinity of the left eye position of the user who wears the HMD 100, as shown in FIG. 1. Data of images (to be referred to as captured images or physical space images hereinafter) of respective frames captured by the left camera 101L are output to the image processing apparatus 206 via the captured image output unit 203L and I/F (interface) 201. Note that the left camera 101L serves as a second camera in this embodiment.

An MPU 200 comprises a CPU, ROM, RAM, and the like, and controls the operations of the respective units that configure the HMD 100. The ROM registers position and orientation relationship information indicating the position and orientation relationship between the right camera 101R and left camera 101L. The position and orientation relationship information may be held in the image processing apparatuses 205 and/or 206. The MPU 200 outputs the position and orientation relationship information to the image processing apparatuses 205 and 206 as needed.

The right display device 102R is a compact and lightweight display device (display device for the right eye) such as an LCD display, organic EL display, or the like, and is attached to the HMD 100 so as to be located in front of the right eye of the user who wears the HMD 100. Note that the right display device 102R serves as a first display device in this embodiment.

The left display device 102L is a compact and lightweight display device (display device for the left eye) such as an LCD display, organic EL display, or the like, and is attached to the HMD 100 so as to be located in front of the left eye of the user who wears the HMD 100. Note that the left display device 102L serves as a second display device in this embodiment.

The captured image output unit 203R outputs, data of the captured images received from the right camera 101R, to the image processing apparatus 205 via the I/F 201.

The captured image output unit 203L outputs, data of the captured images received from the left camera 101L, to the image processing apparatus 206 via the I/F 201.

The display image input unit 204R outputs, to the right display device 102R, an image received from the image processing apparatus 205 via the I/F 201.

The display image input unit 204L outputs, to the left display device 102L, an image received from the image processing apparatus 206 via the I/F 201.

The I/F 201 comprises video image input/output terminals, e.g., DVI, S-VIDEO, IEEE1394, or the like, and is used to connect the image processing apparatuses 205 and 206 to the HMD 100.

The image processing apparatus 205 will be described below. The image processing apparatus 205 makes data communications with the HMD 100 via an I/F 205a. The image processing apparatus 205 generates a composite image (composite image for the right eye) of an image of the physical space seen from the right camera 101R and that of the virtual space by the processing to be described later, and outputs the generated composite image to the HMD 100. Note that the image processing apparatus 205 serves as a first image processing apparatus in this embodiment.

The image processing apparatus 206 will be described below. The image processing apparatus 206 makes data communications with the HMD 100 via an I/F 206a. The image processing apparatus 206 generates a composite image (composite image for the left eye) of an image of the physical space seen from the left camera 101L and that of the virtual space by the processing to be described later, and outputs the generated composite image to the HMD 100. Note that the image processing apparatus 206 serves as a second image processing apparatus in this embodiment.

In the following description, for example, the right camera 101R is defined as a "master camera", and the left camera 101L is defined as a "slave camera". Also, the image processing apparatus 205 arranged for the right-eye unit including the master camera is defined as a "master image processing apparatus", and the image processing apparatus 206 arranged for the left-eye unit including the slave camera is defined as a "slave image processing apparatus". In the following description, the arrangement for the right eye is defined as "master", and that for the left eye is defined as "slave". However, even when these definitions are reversed, the operations of the system are practically the same.

The user connects the HMD 100 and the image processing apparatuses 205 and 206 via cables, and turns on the power supply of the system when he or she uses this system. In the startup processing after power-ON, the right-eye unit and left-eye unit of the HMD 100 respectively transmit pieces of information indicating the right-eye unit and left-eye unit to the connected image processing apparatuses. Upon reception of these pieces of information, the image processing apparatuses 205 and 206 operate with the following functional arrangements.

Figure 3:
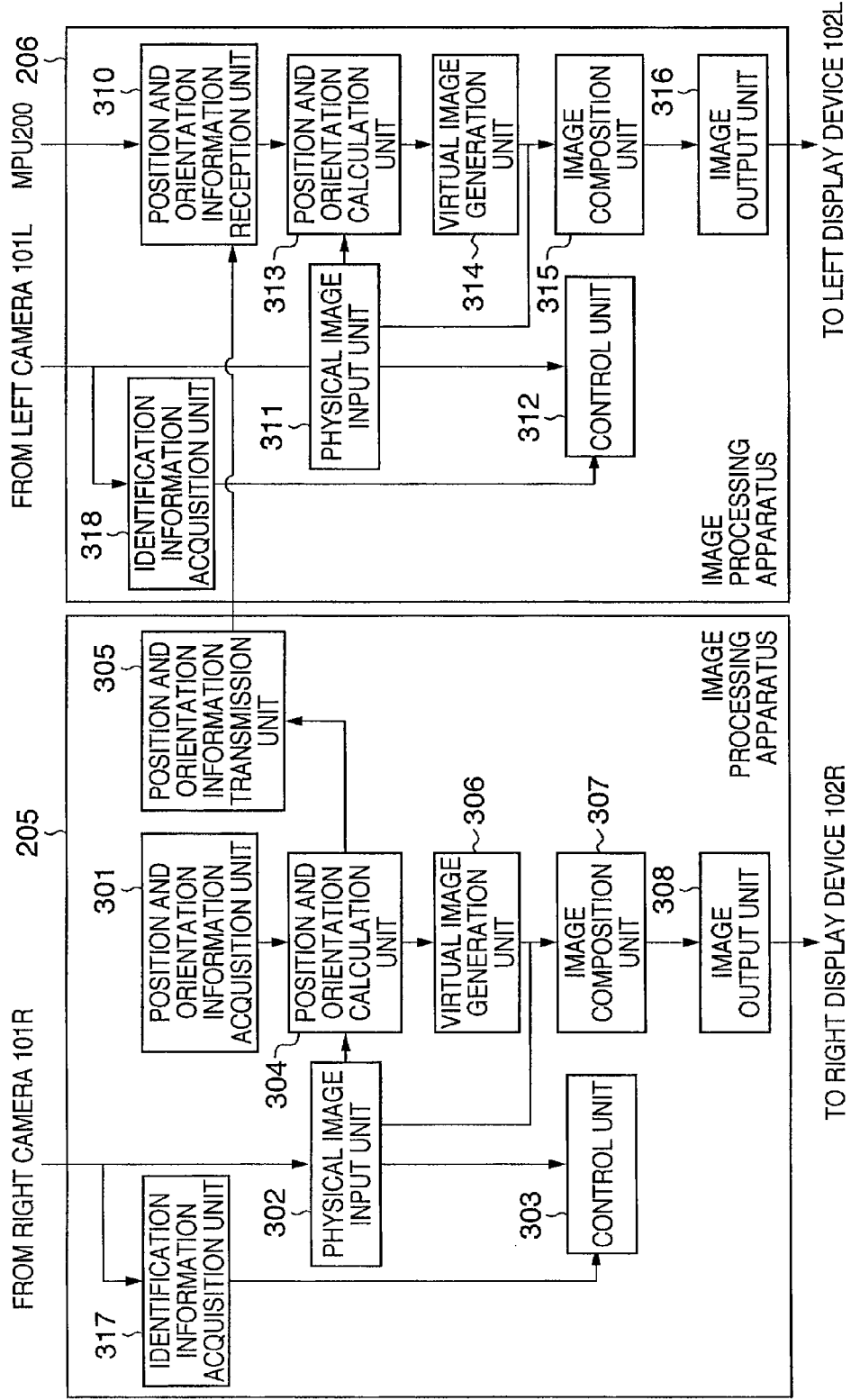
FIG. 3 is a block diagram showing the functional arrangements of image processing apparatuses 205 and 206.

FIG. 3 is a block diagram showing the functional arrangement of the image processing apparatuses 205 and 206. Note that FIG. 3 illustrates that the master image processing apparatus 205 and slave image processing apparatus 206 have different arrangements. However, the image processing apparatus 206 may be connected to the right-eye unit, and the image processing apparatus 205 may be connected to the left-eye unit in some cases. Even in such case, the image processing apparatuses have arrangements that allow their corresponding operations.

The image processing apparatus 205 will be described first.

An identification information acquisition unit 317 acquires identification information from the connected right camera 101R. The acquired identification information is output to a control unit 303.

A position and orientation information acquisition unit 301 acquires, via the network 202, data indicating the position and orientation of the right camera 101R (position and orientation information) measured by an external sensor system (not shown) connected to the network 202. As this sensor system, various sensors such as a magnetic sensor, optical sensor, ultrasonic sensor, and the like are applicable, and arbitrary sensors may be used as long as they can measure the position and orientation of the right camera 101R. Since the sensor system for measuring the position and orientation of a camera is a state-of-the-art technique, a description thereof will not be given. The position and orientation information acquisition unit 301 outputs the acquired position and orientation information to a subsequent position and orientation calculation unit 304.

A physical image input unit 302 acquires the captured images of respective frames sequentially output from the right camera 101R, and outputs them to an image composition unit 307.

The position and orientation calculation unit 304 outputs the position and orientation information received from the position and orientation information acquisition unit 301 to a position and orientation information transmission unit 305 and virtual image generation unit 306. Note that the position and orientation information of the right camera 101R can also be calculated using the captured images input by the physical image input unit 302 together. In this case, the physical image input unit 302 outputs the input captured images also to the position and orientation calculation unit 304. Therefore, the position and orientation calculation unit 304 may use the position and orientation information acquired from the sensor system intact, or may correct the position and orientation information using the captured images. That is, the position and orientation calculation unit 304 may use arbitrary methods as long as it can acquire the position and orientation information of the right camera 101R. Note that a technique for estimating the position and orientation of the right camera 101R based on the captured images captured by the right camera 101R is a state-of-the-art technique, and a description thereof will not be given.

Independently of the acquisition method of the position and orientation information of the right camera 101R, the position and orientation calculation unit 304 outputs the position and orientation information to the position and orientation information transmission unit 305 and virtual image generation unit 306.

The control unit 303 determines a connection state based on the identification information received from the identification information acquisition unit 317, and decides based on the determination result whether to serve as a master or slave image processing apparatus. The control unit 303 controls the operations of the respective units that configure the image processing apparatus 205, and controls data communications with the image processing apparatus 206.

The position and orientation information transmission unit 305 transmits the position and orientation information received from the position and orientation calculation unit 304 to the image processing apparatus 206 side.

The virtual image generation unit 306 generates an image of the virtual space (virtual space image) seen from a viewpoint having the position and orientation indicated by the position and orientation information received from the position and orientation calculation unit 304. Since the method of generating the virtual space image is a state-of-the-art technique, a description thereof will be omitted. The generated virtual space image is output to the subsequent image composition unit 307.

The image composition unit 307 generates a composite image (composite image for the right eye) by superimposing (compositing) the virtual space image received from the virtual image generation unit 306 on the image of the physical space received from the physical image input unit 302. Various techniques have been proposed for the generation method of the composite image by compositing the image of the physical space and virtual space image, and the image composition unit 307 may generate a composite image using arbitrary techniques. The image composition unit 307 outputs the generated composite image to a subsequent image output unit 308.

The image output unit 308 outputs the composite image, received from the image composition unit 307, to the I/F 201 of the HMD 100. This composite image is output to the right display device 102R via the I/F 201 and display image input unit 204R, and is displayed on that right display device 102R. In this manner, the composite image is displayed in front of the right eye of the user who wears the HMD 100 on the head.

The image processing apparatus 206 will be described below.

An identification information acquisition unit 318 acquires identification information from the connected left camera 101L. The acquired identification information is output to a control unit 312.

Upon reception of the position and orientation information transmitted from the position and orientation information transmission unit 305, a position and orientation information reception unit 310 outputs the received position and orientation information to a subsequent position and orientation calculation unit 313. Upon reception of the position and orientation relationship information held by the MPU 200 from the MPU 200 via the I/F 201, the position and orientation information reception unit 310 outputs this information to the position and orientation calculation unit 313.

A physical image input unit 311 acquires the captured images of respective frames sequentially output from the left camera 101L, and outputs them to an image composition unit 315.

The position and orientation calculation unit 313 calculates the position and orientation of the left camera 101L using the position and orientation information and position and orientation relationship information received from the position and orientation information reception unit 310. The unit 313 then outputs data indicating the calculated position and orientation of the left camera 101L to a subsequent virtual image generation unit 314. When the captured image is used to calculate the position and orientation (e.g., the position and orientation calculated by the position and orientation calculation unit 313 are corrected using the captured images), the physical image input unit 311 outputs the input captured images also to the position and orientation calculation unit 313 for the same reasons as on the image processing apparatus 205 side.

Independently of the calculation method of the position and orientation of the left camera 101L, the position and orientation calculation unit 313 outputs data indicating the calculated position and orientation to the virtual image generation unit 314.

The control unit 312 determines a connection state based on the identification information received from the identification information acquisition unit 318, and decides based on the determination result whether to serve as a master or slave image processing apparatus. The control unit 312 controls the operations of the respective units that configure the image processing apparatus 206, and controls data communications with the image processing apparatus 205.

The virtual image generation unit 314 generates an image of the virtual space (virtual space image) seen from a viewpoint having the position and orientation indicated by the data received from the position and orientation calculation unit 313. Since the method of generating the virtual space image is a state-of-the-art technique, a description thereof will be omitted. The generated virtual space image is output to the subsequent image composition unit 315.

The image composition unit 315 generates a composite image (composite image for the left eye) by superimposing (compositing) the virtual space image received from the virtual image generation unit 314 on the image of the physical space received from the physical image input unit 311. Various techniques have been proposed for the generation method of the composite image by compositing the image of the physical space and virtual space image, and the image composition unit 315 may generate a composite image using arbitrary techniques. The image composition unit 315 outputs the generated composite image to a subsequent image output unit 316.

The image output unit 316 outputs to the I/F 201 of the HMD 100 the composite image received from the image composition unit 315. This composite image is output to the left display device 102L via the I/F 201 and display image input unit 204L, and is displayed on that left display device 102L. In this manner, the composite image is displayed in front of the left eye of the user who wears the HMD 100 on the head.

Figure 4:
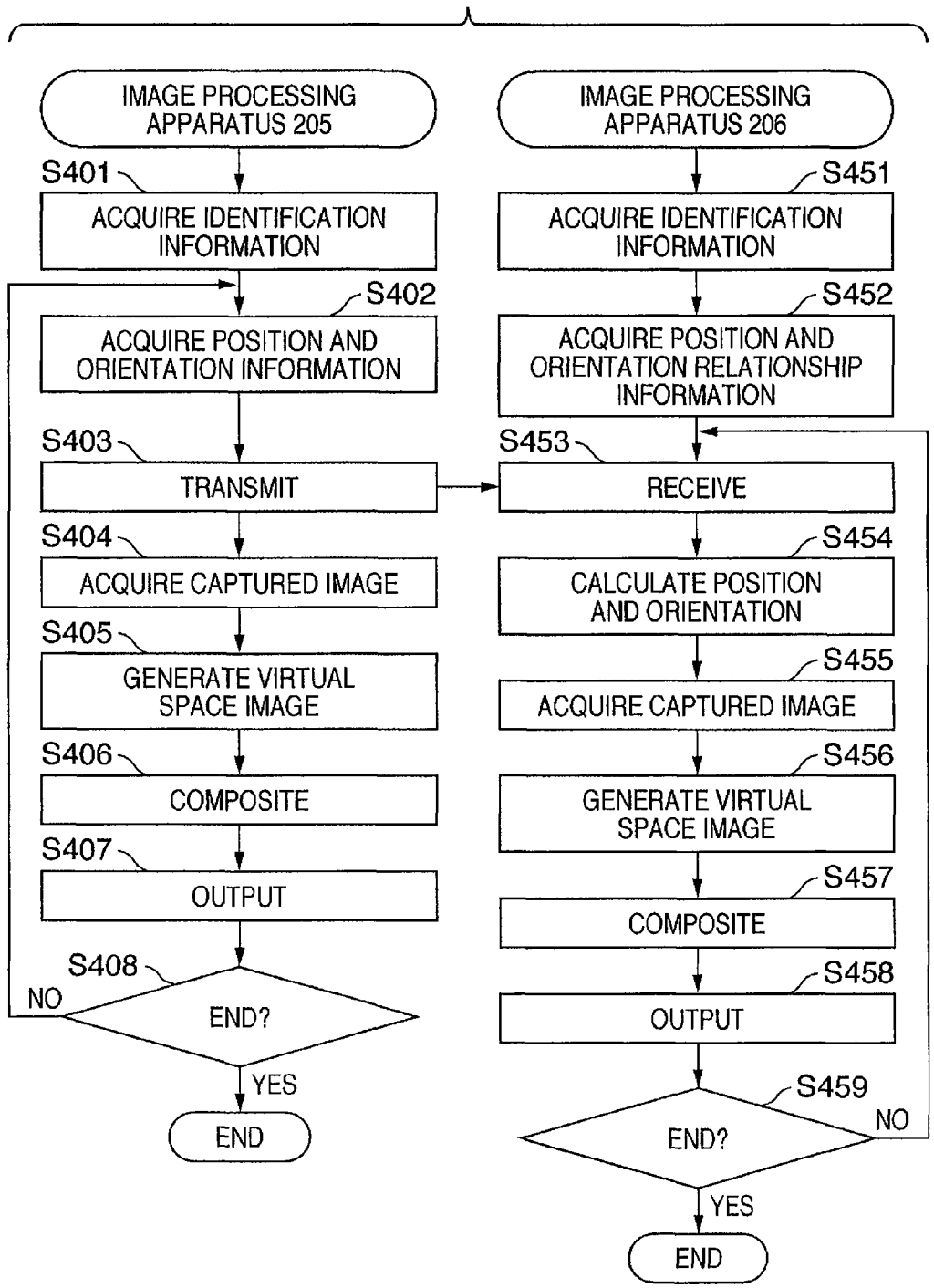
FIG. 4 is a flowchart showing the processes respectively executed by the image processing apparatuses 205 and 206.

FIG. 4 is a flowchart sowing the processes to be executed by the image processing apparatuses 205 and 206, respectively. Since details of the processes to be executed in respective steps are as described above, a brief explanation will be given below.

In step S401, the identification information acquisition unit 317 acquires identification information from the connected right camera 101R. The identification information acquisition unit 317 then outputs the acquired identification information to the control unit 303. The control unit 303 examines the connection state, and determines the subsequent operation. In this example, the control unit 303 determines that the self image processing apparatus serves as a master.

In step S402, the position and orientation information acquisition unit 301 acquires position and orientation information indicating the position and orientation of the right camera 101R. The position and orientation information acquisition unit 301 outputs the acquired position and orientation information to the subsequent position and orientation calculation unit 304.

In step S403, the position and orientation calculation unit 304 outputs the position and orientation information received from the position and orientation information acquisition unit 301 or position and orientation information calculated by an arbitrary method to the position and orientation information transmission unit 305 and virtual image generation unit 306. The position and orientation information transmission unit 305 transmits the position and orientation information received from the position and orientation calculation unit 304 to the image processing apparatus 206 side.

In step S404, the physical image input unit 302 acquires the captured images of respective frames sequentially output from the right camera 101R, and outputs them to the image composition unit 307. Since the process in step S404 can be executed before step S403, when the process for, e.g., correcting the position and orientation information using the captured images is executed in step S403, the captured images are also output to the position and orientation calculation unit 304. In this way, the position and orientation information can be calculated using the captured images in step S403.

In step S405, the virtual image generation unit 306 generates an image of the virtual space (virtual space image) seen from the viewpoint having the position and orientation indicated by the position and orientation information received from the position and orientation calculation unit 304. The virtual image generation unit 306 then outputs the generated virtual space image to the subsequent image composition unit 307.

In step S406, the image composition unit 307 generates a composite image (composite image for the right eye) by superimposing (compositing) the virtual space image received from the virtual image generation unit 306 on the image of the physical space received from the physical image input unit 302. The image composition unit 307 then outputs the generated composite image to the subsequent image output unit 308.

In step S407, the image output unit 308 outputs the composite image received from the image composition unit 307 to the I/F 201 of the HMD 100.

Finally, the control unit 303 checks in step S408 if the end condition of this processing is satisfied, or if an end instruction of this processing is externally input. As a result of this checking, if the end condition of this processing is satisfied, or if the end instruction of this processing is externally input, this processing ends. On other hand, if the end condition of this processing is not satisfied, and no end instruction of this processing is externally input, the process returns to step S402 to execute the subsequent processes for the next frame.

In step S451, the identification information acquisition unit 318 acquires identification information from the connected left camera 101L. The identification information acquisition unit 318 then outputs the acquired identification information to the control unit 312. The control unit 312 examines the connection state, and determines the subsequent operation. In this example, the control unit 312 determines that the self image processing apparatus serves as a slave.

In S452, upon receiving (acquiring) the position and orientation relationship information held by the MPU 200 from the MPU 200 via the I/F 201, the position and orientation information reception unit 310 outputs this information to the position and orientation calculation unit 313.

In step S453, upon reception of the position and orientation information transmitted from the position and orientation information transmission unit 305, the position and orientation information reception unit 310 outputs this information to the subsequent position and orientation calculation unit 313.

In step S454, the position and orientation calculation unit 313 calculates the position and orientation of the left camera 101L using the position and orientation information and position and orientation relationship information received from the position and orientation information reception unit 310. The position and orientation calculation unit 313 then outputs data indicating the calculated position and orientation of the left camera 101L to the subsequent virtual image generation unit 314.

In step S455, the physical image input unit 311 acquires the captured images of respective frames sequentially output from the left camera 101L, and outputs them to the image composition unit 315. Since the process in step S455 can be executed before step S454, when the process for, e.g., correcting the position and orientation using the captured images is executed in step S454, the captured images are also output to the position and orientation calculation unit 313. In this way, the position and orientation can be calculated using the captured images in step S454.

In step S456, the virtual image generation unit 314 generates an image of the virtual space (virtual space image) seen from the viewpoint having the position and orientation indicated by the data received from the position and orientation calculation unit 313. The virtual image generation unit 314 then outputs the generated virtual space image to the subsequent image composition unit 315.

In step S457, the image composition unit 315 generates a composite image (composite image for the left eye) by superimposing (compositing) the virtual space image received from the virtual image generation unit 314 on the image of the physical space received from the physical image input unit 311. The image composition unit 315 then outputs the generated composite image to the subsequent image output unit 316.

In step S458, the image output unit 316 outputs the composite image received from the image composition unit 315 to the I/F 201 of the HMD 100.

Finally, the control unit 312 checks in step S459 if the end condition of this processing is satisfied, or if an end instruction of this processing is externally input. As a result of this checking, if the end condition of this processing is satisfied, or if the end instruction of this processing is externally input, this processing ends. On other hand, if the end condition of this processing is not satisfied, and no end instruction of this processing is externally input, the process returns to step S453 to execute the subsequent processes for the next frame.

As described above, according to this embodiment, when the position and orientation of the right camera 101R are calculated, those of the left camera 101L can be calculated using these position and orientation and the position and orientation relationship information. Therefore, since the positions and orientations of the respective cameras are calculated by the respective image processing apparatuses, the precisions of the positions and orientations of the respective cameras can be improved, and labors for measurement can be reduced. According to this embodiment, the positions and orientations of the right and left cameras can be calculated to have higher precision than the conventional system, and stereoscopic viewing with higher precision can be presented to the user. The user can connect the image processing apparatuses with no regard to their relationship.

<Modification 1>

In the description of this embodiment, the pieces of information indicating the right-eye unit and left-eye unit are transmitted. As the detailed contents of such information, each of the right-eye unit and left-eye unit transmits identification information (device name or the like) unique to the unit to the corresponding image processing apparatus. The image processing apparatus side holds a plurality of sets of identification information and flag information indicating whether the device having this identification information is a master or slave.

Therefore, upon reception of the transmitted identification information, the image processing apparatus 205 refers to flag information corresponding to this identification information, and recognizes whether the connected camera is a master or slave. If the image processing apparatus 205 recognizes that the connected camera is a master, it serves as a master image processing apparatus. On the other hand, if the image processing apparatus 205 recognizes that the connected camera is a slave, it serves as a slave image processing apparatus.

<Modification 2>

In the first embodiment, the position and orientation relationship information indicating the position and orientation relationship between the right camera 101R and left camera 101L is held in the HMD 100 side. However, the position and orientation relationship information may be held on the image processing apparatuses 205 and 206 side. In this case, the image processing apparatus which serves as a slave can acquire the position and orientation relationship information from itself or the other image processing apparatus if it requires the position and orientation relationship information.

Second Embodiment

In the description of the first embodiment, all the respective units which configure the image processing apparatuses 205 and 206 shown in FIG. 3 are configured by hardware components. However, some units may be implemented by a computer program, and such computer program may be executed by a general PC (personal computer), thus obtaining the same result.

Figure 5:
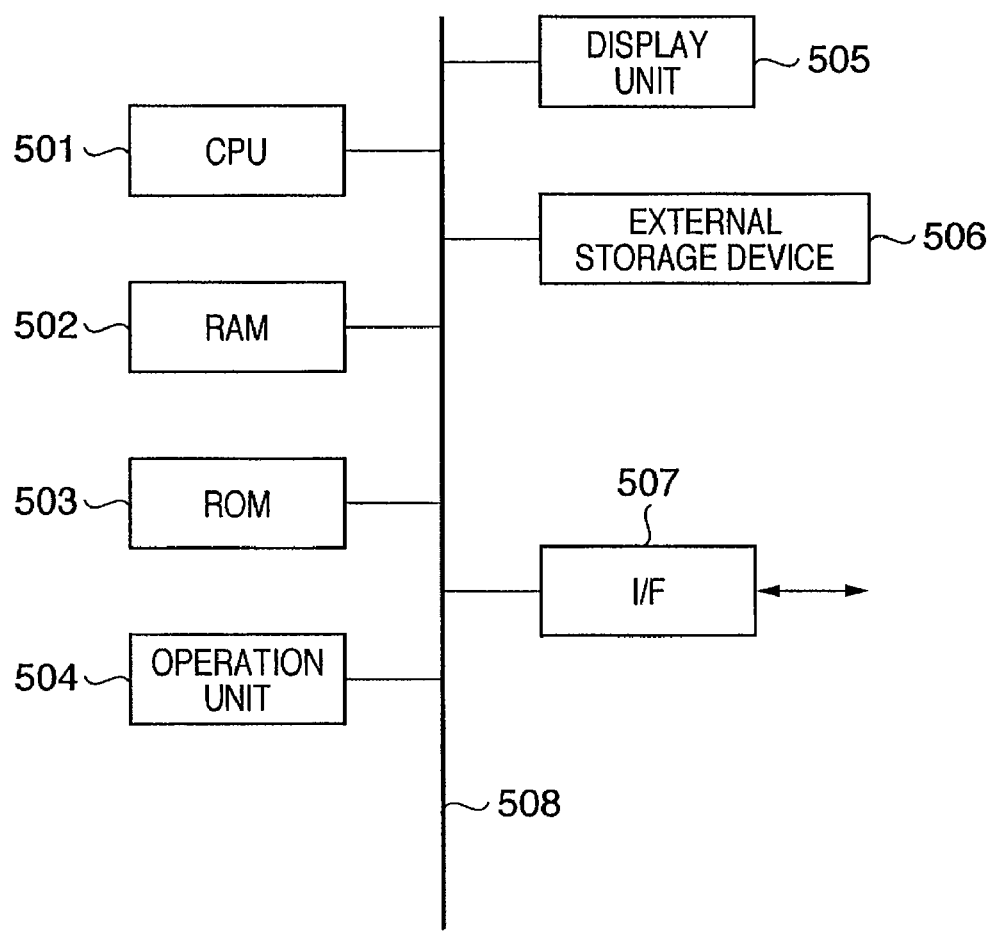
FIG. 5 is a block diagram showing the hardware arrangement of a computer which is applicable to the image processing apparatuses 205 and 206.

FIG. 5 is a block diagram showing the hardware arrangement of a computer which is applicable to the image processing apparatuses 205 and 206.

A CPU 501 controls the overall computer using computer programs and data stored in a RAM 502 and ROM 503, and executes the aforementioned processes to be implemented by the image processing apparatuses 205 and 206 to which the computer is applied. For example, upon applying this computer to the image processing apparatus 205, the CPU 501 serves as the control unit 303. For example, upon applying this computer to the image processing apparatus 206, the CPU 501 serves as the control unit 312.

The RAM 502 has an area for temporarily storing computer programs and data loaded from an external storage device 506, data externally received via an I/F 507, and the like. Furthermore, the RAM 502 also has a work area used when the CPU 501 executes various processes. That is, the RAM 502 can provide various areas as needed.

The ROM 503 stores a boot program, setting data, and the like of the computer.

An operation unit 504 and comprises a keyboard, mouse, and the like. The operator of this computer can input various instructions to the CPU 501 by operating this operation unit 504.

A display unit 505 comprises a CRT, liquid crystal display, or the like. The display unit 505 can display the processing results of the CPU 501 by means of images, characters, and the like.

The external storage device 506 is a large-capacity information storage device represented by a hard disk drive. The external storage device 506 saves an OS (operating system), and computer programs and data for making the CPU 501 execute the respective processes to be implemented by the image processing apparatuses 205 and 206.

For example, upon applying this computer to the image processing apparatus 205, the computer programs include the following computer programs: those for making the CPU 501 execute the functions of the position and orientation calculation unit 304, virtual image generation unit 306, and image composition unit 307.

For example, upon applying this computer to the image processing apparatus 206, the computer programs include the following computer programs: those for making the CPU 501 execute the functions of the position and orientation calculation unit 313, virtual image generation unit 314, and image composition unit 315.

Data saved in the external storage device 506 include data required to generate a virtual space image, and those described as given data.

The computer programs and data saved in the external storage device 506 are loaded onto the RAM 502 under the control of the CPU 501 as needed, and are to be executed by the CPU 501.

The I/F 507 is used to connect this computer to an external apparatus. For example, to the I/F 507, the network 202 and I/F 201 are connected. Upon applying this computer to the image processing apparatus 205, the I/F 507 corresponds to the position and orientation information acquisition unit 301, physical image input unit 302, position and orientation information transmission unit 305, and image output unit 308. Upon applying this computer to the image processing apparatus 206, the I/F 507 corresponds to the position and orientation information reception unit 310, physical image input unit 311, and image output unit 316.

Reference numeral 508 denotes a bus which interconnects the aforementioned units.

Note that the computer having the same hardware arrangement is applied to the image processing apparatuses 205 and 206, but computers having different hardware arrangements may be applied to them.

Other Embodiments

The objects of the present invention can be achieved as follows. That is, a recording medium (or storage medium), which records a program code of software that can implement the functions of the above-mentioned embodiments is supplied to a system or apparatus. Such storage medium is, of course, a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-116113 filed Apr. 25, 2007 which is hereby incorporated by reference herein in its entirety.

What is claimed is:

1. A system which comprises a first image processing apparatus that receives an image of a physical space captured by a first camera of a head mounted display device, and a second image processing apparatus that receives an image of the physical space captured by a second camera of the head mounted display device, said first image processing apparatus comprises:

a determination unit adapted to determine whether or not the first camera is a master;

a unit adapted to acquire, when said determination unit determines that the first camera is a master, position and orientation information of the first camera, and to acquire, when said determination unit determines that the first camera is not a master, position and orientation information of the second camera from said second image processing apparatus;

a unit adapted to output, when said determination unit determines that the first camera is a master, position and orientation information of the first camera to said second image processing apparatus;

a unit adapted to acquire, when said determination unit determines that the first camera is not a master, position and orientation relationship information indicating a position and orientation relationship between the first camera and the second camera;

a unit adapted to calculate, when said determination unit determines that the first camera is not a master, position and orientation information of the first camera based on the position and orientation information of the second camera and the position and orientation relationship information;

a unit adapted to generate a virtual space image based on the position and orientation information of the first camera;

a unit adapted to acquire an image of the physical space captured by the first camera;

a generation unit adapted to generate a composite image formed by compositing the image of the physical space and the virtual space image; and a unit adapted to output the composite image to the head mounted display device, and said second image processing apparatus comprises:

a second determination unit adapted to determine whether or not the second camera is a master;

a unit adapted to acquire, when said second determination unit determines that the second camera is a master, position and orientation information of the second camera, and to acquire, when said second determination unit determines that the second camera is not a master, position and orientation information of the first camera from said first image processing apparatus;

a unit adapted to output, when said second determination unit determines that the second camera is a master, the position and orientation information of the second camera to said first image processing apparatus;

a unit adapted to acquire, when said second determination unit determines that the second camera is not a master, position and orientation relationship information indicating a position and orientation relationship between the first camera and the second camera;

a unit adapted to calculate, when said second determination unit determines that the second camera is not a master, position and orientation information of the second camera based on the position and orientation information of the first camera and the position and orientation relationship information;

a unit adapted to generate a virtual space image based on the position and orientation information of the second camera;

a unit adapted to acquire an image of the physical space captured by the second camera;

a second generation unit adapted to generate a composite image formed by compositing the image of the physical space captured by the second camera and the virtual space image generated based on the position and orientation information of the second camera; and a unit adapted to output the composite image to the head mounted display device.

2. The system according to claim 1, wherein the head mounted display device comprises:

a first display device adapted to display the composite image generated by said generation unit of said first image processing apparatus; and a second display device adapted to display the composite image generated by said second generation unit of said second image processing apparatus.

3. The system according to claim 1, wherein said determination unit of said first image processing apparatus and said second determination unit of said second image processing apparatus, respectively, determine, based on identification information transmitted from the first camera and the second camera, that one of the first camera and the second camera is a master.

* * * * *